April 26, 1966  A. LEDERGERBER  3,248,425
PROCESS FOR RETURNING CARBON DIOXIDE AND
AMMONIA IN THE SYNTHESIS OF UREA
Filed July 11, 1961  4 Sheets-Sheet 2

Fig. 2

INVENTOR:
Anton Ledergerber

Fig. 3

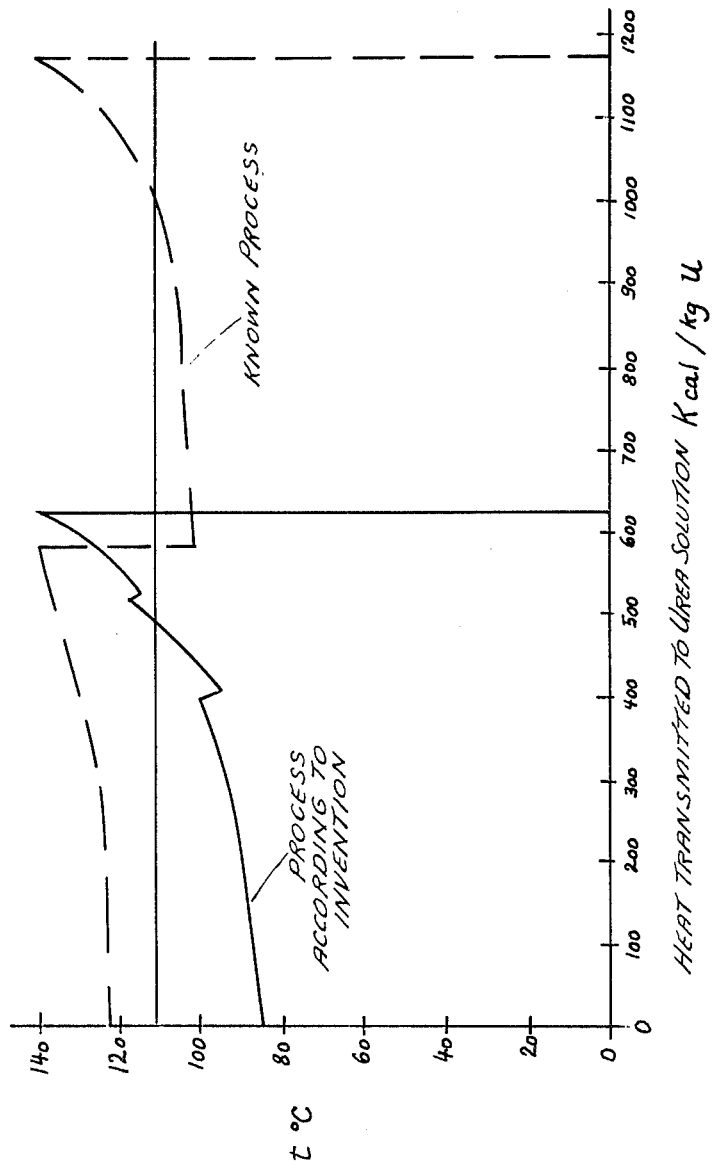

United States Patent Office 3,248,425
Patented Apr. 26, 1966

3,248,425
PROCESS FOR RETURNING CARBON DIOXIDE AND AMMONIA IN THE SYNTHESIS OF UREA
Anton Ledergerber, Domat (Ems), Switzerland, assignor to Inventa AG Fuer Forschung und Patentverwertung, Zurich, Switzerland
Filed July 11, 1961, Ser. No. 123,293
Claims priority, application Switzerland, July 28, 1960, 8,597/60
4 Claims. (Cl. 260—555)

The present invention relates to a process for returning to the system unreacted starting gases from the synthesis of urea from $NH_3$ and $CO_2$, without previous separation.

Processes for urea synthesis are already known in which unreacted starting gases are partly or completely returned to the reactor without any separation taking place.

For instance, one process consists of passing into liquid $NH_3$ the decomposition gases liberated by pressure reduction from the reaction melt and released by subsequent heating; in this process, a suspension is formed of ammonium carbamate in liquid $NH_3$. The suspension has to be circulated through an external cooler for heat dissipation and returned into the reactor by means of a high pressure pump. In industrial practice, this process affords considerable difficulties, caused by deposits formed in the gas condenser, the cooler, and the piping; difficulties are also encountered in providing smooth pumping action to bring the suspension up to synthesis pressure, since it is frequently rich in solid particles and highly concentrated. Therefore, the above-mentioned process could not yet be carried out in practice on a large scale.

According to other suggestions, the above-named difficulties are overcome by adding sufficient water to the unreacted starting products before their return, so that the solution to be recycled no longer contains any solid particles at the temperatures applied. The added water amount may be the lower the higher the temperature is maintained at which formation of the liquid for recycling is effected. On the other hand, a rise in temperature requires application of a higher pressure to the solution, in order to keep the components of the same in a condensed state. All the above-mentioned processes have in common that the formation of the solution containing the main portion of carbamate to be returned is brought about at approximately the same pressure at which the separation of the corresponding carbamate mixture from the urea melt was effected. Since the separation of a considerable amount of the carbamate contained in the urea melt at high pressure requires high decomposition temperature, it is necessary to provide either comparatively large amounts of added water or extremely high decomposition temperatures for a complete or almost complete return of the unreacted starting products.

Since a large amount of water added to the return solution considerably decreases the conversion of carbamate to urea in the reactor for the known reasons of reaction equilibrium, the amount of liquid turned over through the reactor and the recovery plant is markedly increased. This, in turn, requires increased heat supply for the separation of the excess amount of ammonium carbamate and water contained in the synthesis mixture from the urea to be recovered.

It is a known fact that the urea melt is very sensitive to heat as regards the formation of undesirable biuret, of which even small quantities are harmful for many purposes; the temperature degree, as well as the duration of the exposure to that temperature, or the supplied heat quantities, are of decisive effect. If the decomposition temperatures are limited to an acceptable degree, this entails the addition of considerable amounts of water with the disadvantageous consequences above mentioned, when a total or almost total return is to be accomplished according to the processes outlined above.

It is an object of the process according to the invention to avoid the inconveniences and difficulties of the known operating methods and to provide an improved method of effecting the return of unreacted products to the reactor with better yields at lower energy input.

The process according to the invention is based on the principle that at least part to the unreacted reaction products which failed to be converted into urea, are decomposed at comparatively low temperature and pressure, whereas the formation of the return solution is carried out at higher pressure and at a temperature which will prevent solid particles from separating out, even at such a low $H_2O$ content which permits the reaction to proceed in the reactor to an extent only slightly below the value for an anhydrous starting mixture.

The process according to the invention therefore comprises returning into the system unreacted starting gases from the synthesis of urea from $NH_3$ and $CO_2$, said synthesis occurring at increased pressure and elevated temperature. The steps which are characteristic for the invention are the following: Taking the solution used for absorption of the gases decomposed at low pressure and which contains comparatively large amounts of water, increasing the pressure therein by pumping action, expelling the absorbed gases which take along a small amount of water, subjecting the gases to condensation, and returning them into the reactor.

Contrary to known processes, in which the return of gases from carbamate is effected in form of pure solutions free of solid particles, it is possible, when working in accordance with the invention, to keep the supply of heat to the urea solution which is needed during the carbamate decomposition and $H_2O$ expulsion very low, due to the small amount of water present; this results in a small through-put of liquid through the reactor. At the same time the temperature may be kept so low that biuret formation will be cut down to a minimum. A chart attached illustrates a comparison of the temperature-heat diagrams for the case of a total return, as it may be at best achieved by the known processes in a two-stage decomposition, and the corresponding data for the process according to the invention, when carried out under the same conditions, for instance, as illustrated in FIG. 2 hereinbelow.

In the accompanying flow sheets, the invention is illustrated in a number of examples, which are given by way of illustration and not of limitation.

FIG. 2 is another embodiment of the plant for 2-stage operation;

FIG. 3 is yet another embodiment of a plant, and

FIG. 4 is a performance diagram.

Figure 1:
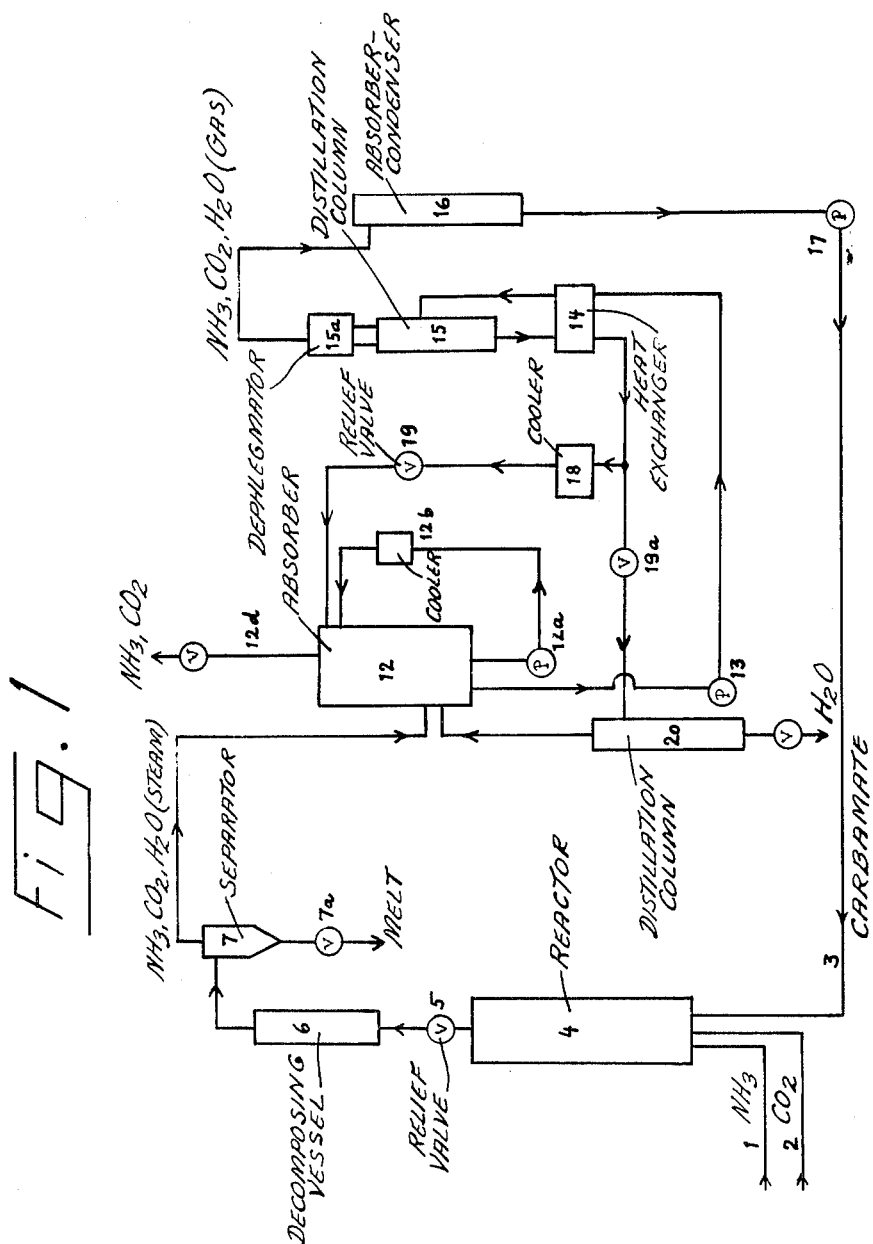
FIG. 1 shows an embodiment of the plant for carrying out the process of the invention in a single stage operation.

Referring now to the flow sheets:

FIG. 1 shows an embodiment of the plant for carrying out the process of the invention which provides almost complete return of the ammonium carbamate which has not been converted into urea with one-stage decomposition.

In this figure, 4 designates a reactor supplied by a pipe 1 with $NH_3$, a pipe 2 with $CO_2$, and a pipe 3 with recycled aqueous carbamate solution. The reactor is maintained at pressure of 150–300 atm. and a temperature of 150–200° C. and the known reaction of urea with formation of water is carried out therein.

A relief valve 5 is provided, which reduces the pressure and permits the gases to pass on to a vessel 6 where under addition of heat, decomposition takes place, so that the largest part of carbamate contained in the urea melt is split into $CO_2$ and $NH_3$, and the main portion of excess $NH_3$ is driven off from the melt together with the amount of $H_2O$ corresponding to the prevailing partial pressure.

A separator 7 is maintained at an excess pressure ranging from 1 to 20 atm., preferably 3 to 6 atm.; there, the escaping gases are separated from the melt. The temperature in the separator may be maintained at 80–140° C. depending on the desired degree of recovery.

The melt, which may be withdrawn from the separator 7, through a valve 7a, and which contains in addition to urea, water and, in most cases, remainders of undecomposed carbamate, as well as some free $NH_3$, is passed on to further processing, for instance, crystallization or granulation.

The separated gases, $NH_3$, $CO_2$, and $H_2O$, are fed from the separator 7 to an absorber 12, where they are almost completely condensed in a concentrated aqueous solution of carbamate or carbonate, or a mixture of both with free $NH_3$. The heat to be dissipated may be withdrawn from the system over a cooling cycle through a pump 12a and a cooler 12b.

The solution for absorption in the following called "carbamate solution," may contain at the inlet 5–35% by weight $NH_3$ (total amount), at the discharge 10–50% B.W. $NH_3$ (total amount).

The inert gases introduced with fresh ammonia and $CO_2$ over pipes 1 and 2, may advantageously be withdrawn, while carrying along small amounts of $NH_3$, $CO_2$, and $H_2O$ from absorber 12 by a pipe 12d and are thus removed from the system.

The pressure in the absorber 12 is approximately similar to the one in the separator 7, the temperature of the solution is 20–80° C.—preferably 40–60° C., depending on the cooling conditions.

The highly concentrated solution leaving the absorber 12 is pumped by means of a pump 13 to a heat exchanger 14, where it is pre-heated, and from there to a distillation column 15. At the head of this column a mixture of $NH_3$ and $CO_2$ is driven off by heat supply and escapes to an absorber-condenser 16, which is maintained under pressure. If desired, the distillation column 15 may contain, in addition to the section where the gases are expelled, another part with a dephlegmator 15a for adjustment of the water content of the escaping gases, when this can be done under the prevailing conditions without the deposition of solid carbamate. In the absorber 16, the gases are condensed most of the time without addition of fresh ammonia, that is to say: when the ammonia excess in the reactor is about 3.5:1. If the excess is less than 3.5:1, it may be sometimes advantageous to add fresh ammonia at this point.

Since the gas contains only a minimum of water and separation of solid carbamate might occur at the comparatively cold cooling surfaces under the high pressures prevailing, it is desirable to design the absorber 16 in such a manner that the gas to be condensed is directly passed into the condensate and recycled by means of a circulating pump through a cooler, whereby the condensation heat is continuously transferred to the cooling medium by a cooling surface rinsed with liquid. In order to avoid deposit of solid carbamate, the wall temperature is maintained approximately at the level of the temperature of separation. For that purpose, the heat is preferably transferred to a secondary cycle.

The condensate, which contains about 3 to 15% by weight $H_2O$, is recycled by a high pressure pump 17 through pipe 3 into the reactor 4. The composition and the amount of the return solution is determined by the chosen molar ratio $NH_3:CO_2$ of the starting gases, and by the conditions of the reaction in the reactor 4.

The temperature in the pressure absorber 16 should be sufficiently above the separation temperature of the solution which is mainly depending on the $H_2O$ content. The pressure to be maintained in the absorber 16 and in the distillation column 15 depends on the relations of the vapor pressures. The temperature in the absorber 16 may be between 65 and 110° C., preferably 80–100° C., the excess pressure between 30 and 70 atm. In the sump of the distillation column 15, a solution is withdrawn with a content of $CO_2$ and $NH_3$ diminished by the amount of the gases which escaped on top. The sump temperature of the distillation column 15 depends on the available heating medium, i.e. the pressure of the heating vapor. In the exchanger 14, heat is withdrawn from the effluent solution and transferred to the incoming solution arriving in countercurrent at 14. The main part of the solution is returned to the absorber 12 after having undergone additional cooling in a cooler 18 and pressure reduction at a relief valve 19; in the absorber 12, the solution is reconcentrated by absorption of the gases. The balance of the solution is passed through a valve 19a to a distillation column 20, where the necessary amount of water for meeting the $H_2O$ balance of the system is removed therefrom, the $NH_3$ and $CO_2$ present being expelled and returned to absorber 12.

In the following Example 1, the process will be explained in detail with reference to flow sheet No. 1.

EXAMPLE 1

*Reactor mixture*

Pipe line:
1—590 kg./h. $NH_3$.
2—740 kg./h. $CO_2$
3—1672 kg./h. returned solution consisting of: 41 weight percent free $NH_3$, 49 weight percent carbamate, 10 weight percent $H_2O$.

In reactor 4 the reaction of the mixture is proceeding at 200 atm. excess pressure and 180° C.

| Melt from reactor: | Kg./h. |
| --- | --- |
| Urea | 1000 |
| Free $NH_3$ | 697 |
| Carbamate | 833 |
| $H_2O$ | 472 |
| Melt | 3002 |

After pressure release and subsequent heating in decomposition vessel 6, the following amounts of gases are withdrawn from separator 7:

| | Kg./h. |
| --- | --- |
| $NH_3$ | 1049 |
| $CO_2$ | 466 |
| $H_2O$ | 343 |
| Total | 1858 |

| In the melt remains: | Kg./h. |
| --- | --- |
| Urea | 1000 |
| $NH_3$ | 11 |
| $CO_2$ | 4 |
| $H_2O$ | 129 |
| Total melt | 1144 |

The decomposition of the carbamate takes place in the separator 7 and amounts to about 99% at an excess pressure of 4 atm., and at a temperature of about 130° C.

The pressure from the melt is released and the melt returns to further processing, while the decomposition gases are passed into the absorber 12, where they are practically totally condensed together with the gas from the distillation column 20. The solution passed into the absorber 12 is enriched by the gas condensation and leaves the apparatus at a temperature of about 50° C. with the composition of e.g. 37% by weight $NH_3$, 20 by weight $CO_2$ and 43% by weight $H_2O$. In the heat exchanger 14, the solution is preheated to about 135° C. and arrives at the distillation column 15 where a mixture of gases is withdrawn at the head which amounts to 1672 kg./hr. and consists of 1037 kg./h. $NH_3$, 463 kg./h. $CO_2$ and 172 kg./hr. $H_2O$. These gases are introduced into the pressure absorber 16, where they are completely condensed without addition of an absorption agent by direct contact with the condensate at a temperature of 80–90° C. and an excess pressure of 50 atm.

Under these conditions the condensate remains free of solid particles and may be returned without difficulties through heated pumps into the reactor 4.

As may be seen from this example, an approximately 99% return can be accomplished with a one-stage decomposition and at a decomposition temperature of 130° C.

In case a lower amount of returned gases is sufficient, that is to say—if there is a satisfactory possibility of using non-returned amounts of $CO_2$ and $NH_3$, it is possible to simplify the apparatus by omitting the distillation column 20 while using a higher pressure in the decomposition vessel or in the absorber 12 or to obtain a better product using a lower decomposition temperature, for instance 90° C. instead of 130° C., and thereby decreasing the biuret content.

The process according to the invention first makes it possible to obtain a better product as compared to known processes—even when only part of the solution is returned.

However, if it is desired to keep the biuret content at a minimum with complete return of the unreacted starting gases, it is advantageous to use a two-stage or a multiple stage decomposition, as illustrated in the flow sheet of FIG. 2.

The principle of the apparatus is the same as that of the one shown in FIG. 1, but a number of units are added, namely: an after-decomposing vessel 8, a separator 9, and a condenser 10, pump 11, as well as a washing attachment 12c.

Since with other conditions being equal the temperature in the separator 7 is lower for the purpose of lowering the biuret content, decomposition will occur at this stage to a lower degree. After the pressure over the melt has been released by valve 7b, it is necessary to supply part of the decomposition heat in the after-decomposing vessel 8. In the separator 9, in which operation is carried out approximately at atmosphereic pressure or under a slight vacuum, at a temperature of 100–130° C., the urea melt, which is practically free of carbamate and $NH_3$, is separated from the escaped gases which are introduced into the condenser 10 where they are completely condensed with the addition of a small amount of $H_2O$ or a dilute carbamate-water solution. The effluent solution is brought up to the pressure of the absorber 12 by means of the pump 11, and admitted to the head of the column into the washing attachment 12c. Since the washing solution is of lower concentration as compared to the concentration of the remainder of the incoming solution, the inert gases which are to be removed from absorber 12 through pipe 12d will be withdrawn at a greater degree of purity than according to Example 1.

In the following Example 2, a detailed description will be given of the operation carried out in the apparatus of FIG. 2.

EXAMPLE 2

*Reactor mixture*

Pipe line:
1—570 kg./h. $NH_3$.
2—735 kg./h. $CO_2$.
3—1697 kg./h. returned solution consisting of 41 weight percent free $NH_3$, 49 weight percent carbamate, 10 weight percent $H_2O$.

Decomposed gas from first decomposition vessel at 4 atm. excess pressure and a temperature of 100° C. in the separator.

| | Kg./h. |
|---|---|
| $NH_3$ | 1015 |
| $CO_2$ | 452 |
| $H_2O$ | 170 |
| Total | 1637 |

*Melt from 1st decomposition vessel*

| | Kg./h. |
|---|---|
| Urea | 1000 |
| $NH_3$ | 45 |
| $CO_2$ | 18 |
| $H_2O$ | 302 |
| Total | 1365 |

*Decomposed gas from 2nd decomposition vessel*

At 1 atm. excess pressure and 118° C.

| | Kg./h. |
|---|---|
| $NH_3$ | 42 |
| $CO_2$ | 16 |
| $H_2O$ | 126 |
| Total | 184 |

*Melt from 2nd decomposition vessel*

| | Kg./h. |
|---|---|
| Urea | 1000 |
| $NH_3$ | 3 |
| $CO_2$ | 2 |
| $H_2O$ | 176 |
| Total | 1181 |

Thus the degree of decomposition amounts to about 96% after the 1st decomposition vessel, and to about 99.5% after the 2nd decomposition vessel, at a temperature of about 100° C. after the 1st decomposition, where the main part of the decomposition heat is supplied.

*Condenser 10*

| | Kg./h. |
|---|---|
| Gas from 2nd decomposition | 184 |
| Added water | 122 |
| Effluent condenser [1] | 306 |

[1] Consisting of: 14 weight percent $NH_3$, 5 weight percent $CO_2$, 81 weight percent $H_2O$.

The other figures are the same as those in Example 1.

From Example 2, it may be seen that in working in an apparatus according to FIG. 2—that is with two-stage decomposition—and operating at a temperature of only 100° C. while supplying the heat for decomposition, 99% of the non-converted starting material can be returned to the reactor.

In the above given examples for carrying out the inventive principle, the separation of the decomposed gases occurs at comparatively low pressure (of less than 20 atm. excess pressure) and the non-reacted starting materials to be returned have to be brought up from the low pressure in an aqueous solution to the high pressure of absorber 16.

Figure 3:
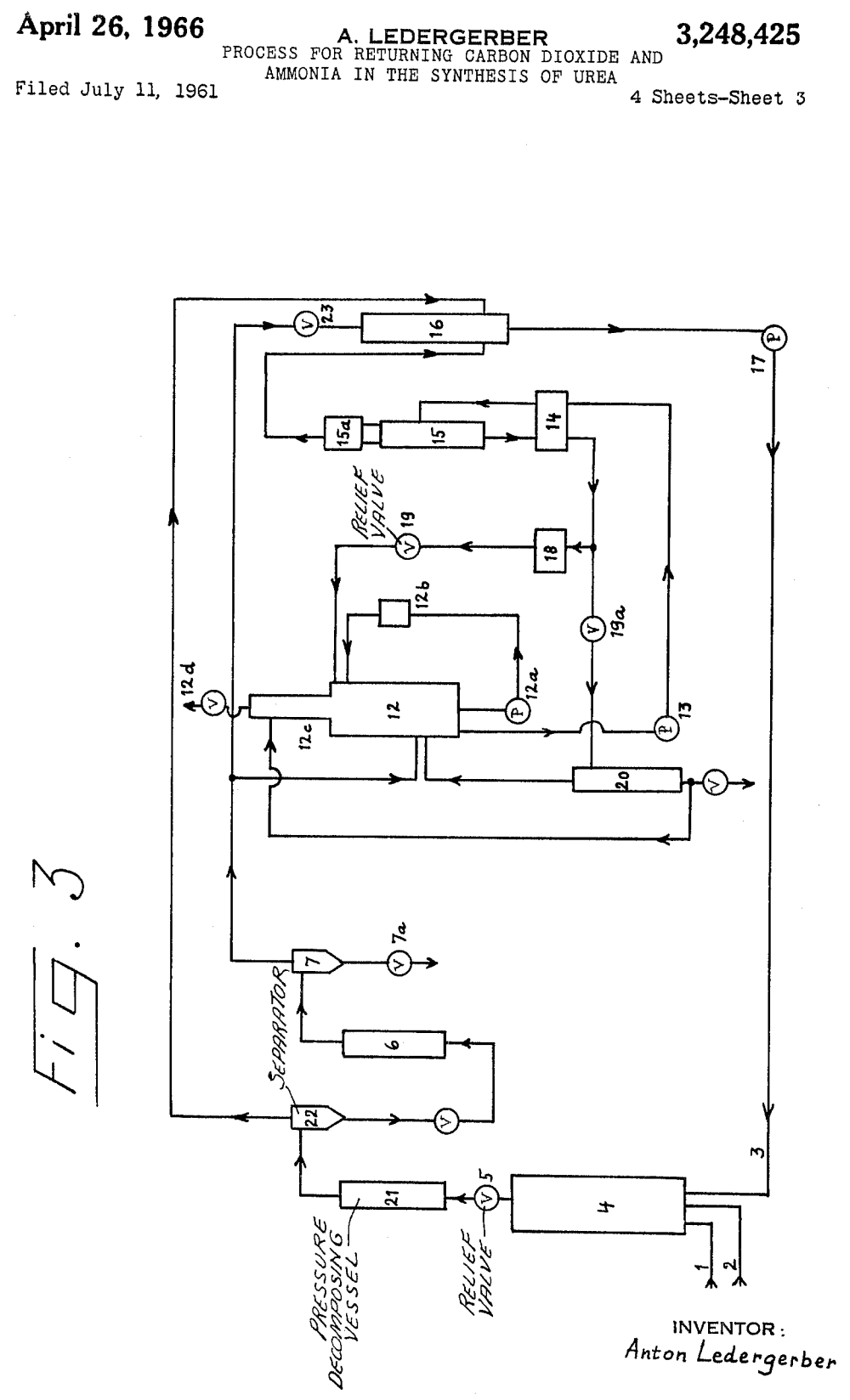

In another embodiment illustrated in FIG. 3, part of the products to be returned are directly passed from the separator 7 through a valve 23 to the absorber 16. This embodiment is particularly useful when the ratio at which $NH_3$ and $CO_2$ are fed into the reactor is high in $NH_3$—for instance, 6 mols $NH_3$ per 1 mol $CO_2$. Basically, FIG. 3 corresponds to FIG. 1, with a washing attachment 12C, and devices 21, 22, and 23 being added.

Pressure of the melt coming from the reactor 4 is first relieved to a pressure of 30–70 atm. by the pressure relief, with or without a small amount of heat supplied in a pressure decomposing vessel 21, the major part of the excess ammonia and part of $CO_2$ and $H_2O$ in an amount corresponding to their partial pressures, are separated from the melt in a separator 22 and are directly passed on to the absorber 16, whereby this part of the decomposition products bypasses the rest of the units in the apparatus.

With a large ratio of $NH_3:CO_2$, the conversion in the reactor 4, calculated on $CO_2$, is much larger than with medium or small ratio, and in the recovery the greater part of the excess $NH_3$ by-passes the distillation column 15; the heat required for the gas expulsion in distillation column 15 and thereby the total heat input is therefore smaller than in the modes of operation described above. Those units, which are by-passed by the larger part of the excess ammonia, may be made of smaller dimension since they are charged to a considerably lower extent. On the other hand, the reactor 4 has to manage a higher charge, and therefore it has to be of larger size than with a medium ratio of starting gases, say: 3.5 mols $NH_3$ per mol $CO_2$, particularly in view of the fact that the melt is of lower density.

EXAMPLE 3

*Reactor mixture*

Through pipe line:
1—580 kg./h. $NH_3$.
2—744 kg./h. $CO_2$.
3—2119 kg./h. returned sol. consisting of: 71 weight percent free $NH_3$, 19.5 weight percent carbamate, 9.5 weight percent $H_2O$.

Ratio: 6 mol $NH_3$/mol $CO_2$.
In reactor 4, the reaction of the starting materials occurs at 300 atm. excess pressure and 180° C.

*Melt leaving reactor*

| | Kg./h. |
|---|---|
| Urea | 1000 |
| Free $NH_3$ | 1510 |
| Carbamate | 435 |
| $H_2O$ | 500 |
| Melt | 3445 |

In separator 22 to decomposition vessel 21, at 50 atm. excess pressure and temperature about 135° C., 1215 kg./h. consisting of

| | Kg./h. |
|---|---|
| $NH_3$ | 1135 |
| $CO_2$ | 57 |
| $H_2O$ | 23 | are separated from the remaining melt amounting to 2230 kg./h. and consisting of

| | Kg./h. |
|---|---|
| Urea | 1000 |
| Free $NH_3$ | 420 |
| Carbamate | 333 |
| $H_2O$ | 477 | and passed through decomposition vessel 6 to separator 7 at 4 atm. excess pressure and 130° C.

| | Kg./h. |
|---|---|
| Gas | 1029 |
| Consisting of: | |
| $NH_3$ | 550 |
| $CO_2$ | 128 |
| $H_2O$ | 301 | are separated from the remaining melt, consisting of

| | Kg./h. |
|---|---|
| Urea | 1000 |
| $NH_3$ (total) | 15 |
| $CO_2$ | 10 |
| $H_2O$ | 176 |
| Melt [1] | 1201 |

[1] Pressure is reduced over the melt, which is withdrawn for further processing.

At the head of the distillation column 15, 960 kg./hr. of a gas mixture are escaping which consists of 605 kg./hr. $NH_3$, 178 kg./hr. $CO_2$ and 177 kg./hr. $H_2O$ that are supplied to the absorber 16. Since these amounts of gases are only about 60% of those in Example 1, the loads of columns 12 and 15 are correspondingly smaller as is the heat requirement for expelling those gases.

FIG. 4 is a diagram showing the difference in heat transfer at various temperatures when the process of the invention is compared to the known processes.

In the diagram, the temperatures are plotted on the ordinate in degrees C., the amount of heat transferred to the urea solution on the abscissa in kcal./kg. urea.

The known process is illustrated by broken lines, the new process by heavy lines. The comparison shows that a two-stage process was needed to achieve comparable results with the single-stage operation of the present invention.

What is claimed is:
1. Process for the synthesis of urea by reaction of $NH_3$, $CO_2$ and recycled $NH_4$ carbamate solution which comprises the steps of:
   (a) reacting $NH_3$, $CO_2$ and recycled carbamate solution to form a urea melt;
   (b) separating unreacted $NH_3$, $CO_2$ and water vapor from said urea melt and absorbing same in an aqueous carbamate solution at a pressure below that prevailing during said urea formation reaction;
   (c) raising the pressure of said aqueous carbamate solution to a pressure intermediate between that of said urea formation reaction and said absorption;
   (d) reliberating said unreacted gases from said carbamate solution by distillation;
   (e) condensing the reliberated gases to form a concentrated recycle carbamate solution;
   (f) maintaining the temperature of said recycle carbamate solution sufficiently high to prevent salting out of the dissolved ingredients; and
   (g) returning the said recycle carbamate solution to the original urea formation reaction at the pressure prevailing therein.
2. The process of claim 1, in which the urea formation reaction pressure is between about 150 and 300 atmospheres, the absorption pressure is between about 1 and 20 atmospheres, and the formation pressure of the aqueous carbamate recycle solution is between about 30 and 70 atmospheres.
3. The process of claim 2, in which the urea formation reaction temperature is between about 150° and 200° C., the gas separation temperature is between 80° and 140° C., the absorption temperature is between about 20° and 80° C., and the formation temperature of the recycle solution is between about 65° and 110° C.
4. The process as claimed in claim 1, wherein the recycle solution consists of 50–85% by vol. of ammonia, 10–35% $CO_2$ and 3–15% $H_2O$.

References Cited by the Examiner

UNITED STATES PATENTS

| 1,429,483 | 9/1922 | Bosch et al. | 260—555 |
| 1,453,069 | 4/1923 | Meiser et al. | 260—555 |
| 2,848,493 | 8/1958 | Dewling et al. | 260—555 |

OTHER REFERENCES

Krase et al.: Ind. Eng. Chem., vol. 22 (1930), pages 289–93.

HENRY R. JILES, *Acting Primary Examiner.*

IRVING MARCUS, *Examiner.*